(12) United States Patent
Morikami

(10) Patent No.: US 10,730,224 B2
(45) Date of Patent: Aug. 4, 2020

(54) CONTAINER MANUFACTURING DEVICE

(71) Applicant: DISCMA AG, Hunenberg (CH)

(72) Inventor: Shigeki Morikami, Kanagawa (JP)

(73) Assignee: Discma AG, Zürich (CH)

( * ) Notice: Subject to any disclaimer, the term of this patent is extended or adjusted under 35 U.S.C. 154(b) by 130 days.

(21) Appl. No.: 15/553,747

(22) PCT Filed: Jan. 20, 2016

(86) PCT No.: PCT/JP2016/000277
§ 371 (c)(1),
(2) Date: Aug. 25, 2017

(87) PCT Pub. No.: WO2016/136129
PCT Pub. Date: Sep. 1, 2016

(65) Prior Publication Data
US 2018/0029280 A1 Feb. 1, 2018

(30) Foreign Application Priority Data

Feb. 27, 2015 (JP) .................. 2015-038742

(51) Int. Cl.
*B29C 49/02* (2006.01)
*B29C 49/46* (2006.01)
*B29C 49/78* (2006.01)
*B29C 49/06* (2006.01)
*B29C 49/48* (2006.01)
*B29B 11/08* (2006.01)
(Continued)

(52) U.S. Cl.
CPC ............. *B29C 49/02* (2013.01); *B29C 49/06* (2013.01); *B29C 49/46* (2013.01); *B29C 49/78* (2013.01); *B29B 11/08* (2013.01); *B29B 11/12* (2013.01); *B29C 49/064* (2013.01); *B29C 49/6427* (2013.01); *B29C 2049/023* (2013.01); *B29C 2049/028* (2013.01); *B29C 2049/465* (2013.01); *B29C 2049/4869* (2013.01)

(58) Field of Classification Search
CPC ........ B29C 2049/023; B29C 2049/028; B29C 46/46; B29C 2049/465; B29C 2049/4664; B29C 2049/4869
See application file for complete search history.

(56) References Cited

U.S. PATENT DOCUMENTS

| | | | |
|---|---|---|---|
| 2005/0206045 | A1 | 9/2005 | Desanaux et al. |
| 2008/0042325 | A1 | 2/2008 | Imatani et al. |
| 2011/0146202 | A1 | 6/2011 | Imatani et al. |

(Continued)

FOREIGN PATENT DOCUMENTS

| | | |
|---|---|---|
| JP | 2003-251685 A | 9/2003 |
| JP | 2013-198999 A | 10/2013 |
| JP | 2014-083813 A | 5/2014 |

*Primary Examiner* — Robert B Davis
(74) *Attorney, Agent, or Firm* — Eric J. Sosenko; Jonathan P. O'Brien; Honigman LLP

(57) ABSTRACT

A container manufacturing device having a preform manufacturing portion, a conveyor, a blow molding device, where the preform is to the blow molding device while maintain the residual heat from the preform manufacturing portion. The preform manufacturing portion includes a molding die and a feeder for supplying a molten thermoplastic resin to a cavity of the molding die. In the blow molding portion, liquid is used to mold the preform into a container of a predetermined shape.

7 Claims, 2 Drawing Sheets

(51) Int. Cl.
*B29B 11/12* (2006.01)
*B29C 49/64* (2006.01)

(56) References Cited

U.S. PATENT DOCUMENTS

| | | | |
|---|---|---|---|
| 2013/0106028 A1* | 5/2013 | Lisch | B29D 22/003 264/532 |
| 2013/0236589 A1* | 9/2013 | Yamaguchi | B29C 49/06 425/526 |
| 2014/0367895 A1 | 12/2014 | Sato et al. | |

* cited by examiner

CONTAINER MANUFACTURING DEVICE

TECHNICAL FIELD

The present invention relates to a container manufacturing device for manufacturing a resin container, and particularly relates to container manufacturing device for manufacturing a container of a predetermined shape by liquid blow molding a resin preform.

BACKGROUND

A resin container, such as those represented by a bottle made of oriented polypropylene (OPP) and a bottle made of polyethylene terephthalate (PET) (PET bottle), has been used for various purposes including use for beverages, food, cosmetics, and the like. Such a container is generally manufactured by first forming a preform having a bottomed tubular shape by injection molding and compression molding a thermoplastic resin, heating the preform in a heating furnace to a temperature at which a stretching effect is exhibited, and molding the heated preform into a predetermined shape by blow molding using a die for blow molding (for example, Japanese Unexamined Application Publication No. 2003-251685).

For blow molding of the preform, liquid blow molding is a known process in which blow molding is carried out by supplying a pressurized liquid into the preform instead of pressurized air. With liquid blow molding, it is possible to simplify the production process and the configuration of the blow molding device by omitting the post forming process for filling a container with a content liquid, by using a content liquid to be filled in a container as a final product, such as beverages, cosmetics, medicine, and the like.

SUMMARY OF THE INVENTION

Conventionally, when manufacturing a container by liquid blow molding a resin preform, a resin preform manufactured in advance at another location is conveyed to a blow molding device, and blow molding is carried out by reheating the conveyed preform in a heating furnace to a temperature at which a stretching effect is exhibited. Thus, the preform requires a conveying cost to be conveyed from a manufacturing location to a blow molding device, and energy for reheating the preform after being conveyed, resulting in a problem that the manufacturing cost of the container increases.

With the foregoing in view, it is an object of the present invention to provide a container manufacturing device that can manufacture a resin container at a low cost.

The container manufacturing device embodying the principles of the present invention is a container manufacturing device for manufacturing a resin container, having: a preform manufacturing portion for manufacturing a resin preform by molding a thermoplastic resin in a molding die, provided with a molding die and a feeder for supplying a molten thermoplastic resin in a cavity in the molding die; a conveyor for conveying the preform manufactured in the preform manufacturing portion; and a blow molding portion for liquid blow molding the preform in a container of a predetermined shape, provided with a blow molding die and a pressurized liquid feeder for supplying liquid pressurized in the preform conveyed using the conveyor and disposed in the cavity of the blow molding die; wherein it is preferable for the preform manufactured in the preform manufacturing portion to be conveyed to the cavity in the blow molding die while maintaining a residual heat state via the conveyor and then liquid blow molded by the blow molding portion.

The container manufacturing device of the present invention according to the above configuration, wherein the preform is conveyed to the cavity in the blow molding die while in a residual heat state equal to or greater than a temperature suitable for liquid blow molding in the blow molding portion via the conveyor.

The container manufacturing device of the present invention according to the above configuration, wherein the molding die is preferably an injection molding die, and the preform molding portion manufactures the preform by injection molding.

The container manufacturing device of the present invention according to the above configuration, wherein the molding die is preferably a compression molding die, and the preform molding portion manufactures the preform by compression molding.

The container manufacturing device of the present invention according to the above configuration, wherein the molding die and the blow molding die preferably are respectively provided with a plurality of cavities.

The container manufacturing device of the present invention according to the above configuration, wherein a conditioning station for holding the preform removed from the cavities in the molding die at a predetermined temperature is preferably provided between the preform manufacturing portion and the blow molding portion.

The container manufacturing device of the present invention according to the above configuration, wherein the conveyor preferably conveys the preform in a linear path from the conditioning station to the cavities in the blow molding die.

According to the present invention, because the container manufacturing device is configured having a preform manufacturing portion for manufacturing the preform by molding a thermoplastic resin heated in a molding die, and a blow molding portion for liquid blow molding the preform manufactured in the preform manufacturing portion into a container of a predetermined shape, a conveying cost for conveying a manufacture preform to the blow molding portion is unnecessary, and furthermore, by setting the preform at a temperature suitable for blow molding using the residual heat during molding, reheating the preform is unnecessary, and thus the manufacturing cost of the resin container can be decreased. Therefore, according to the present invention, it is possible to provide a container manufacturing device that can manufacture a resin container at a low cost.

DETAILED DESCRIPTION

The present invention will be described in detail below as an example with reference to the drawings.

Figure 1:
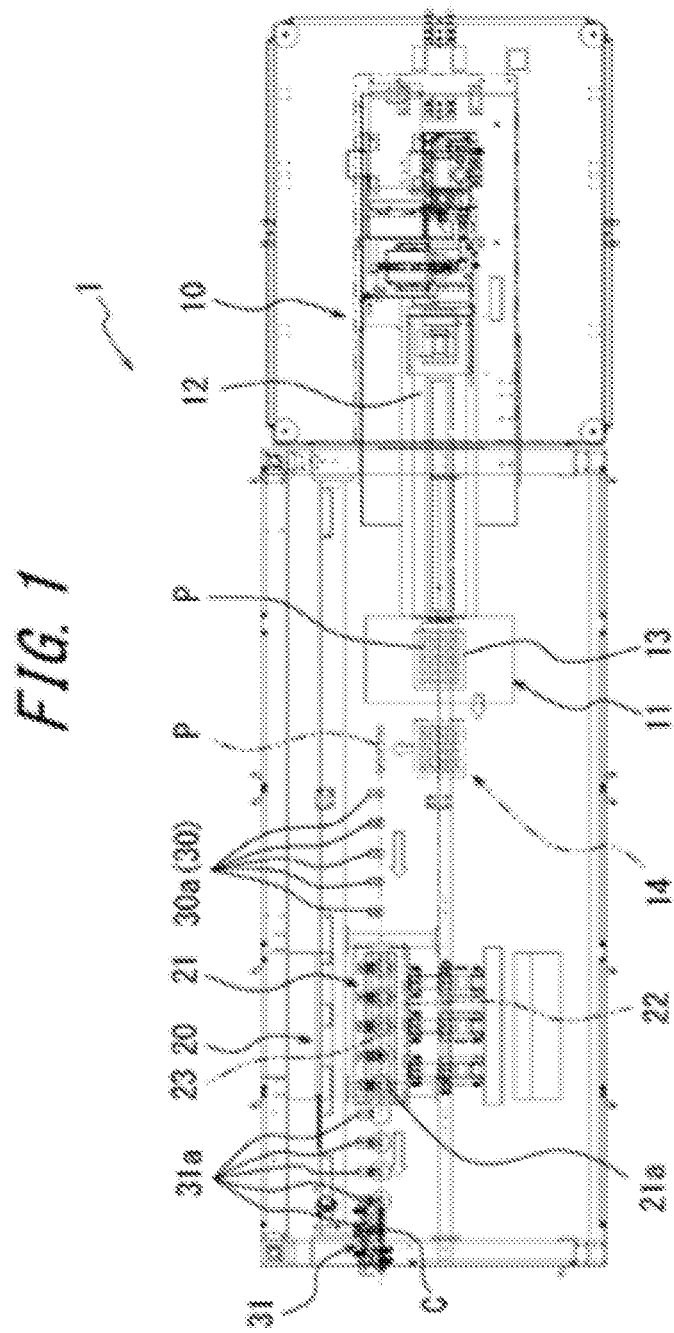
FIG. 1 is a planar view schematically illustrating a container manufacturing device embodying the principles of the present invention.

A container manufacturing device 1, which embodies the principles of the present invention illustrated in FIG. 1, manufactures a resin container C of a predetermined shape from a thermoplastic resin. A case is illustrated in the present embodiment where a bottle filled with a liquid, such as a beverage, is manufactured as the container C from a thermoplastic resin such as polypropylene (PP) and polyethylene terephthalate (PET).

The container manufacturing device 1 has a preform manufacturing portion 10 for manufacturing a resin preform P by injection molding, and a blow molding portion 20 for liquid blow molding the preform P manufactured in the preform manufacturing portion 10 into a container C of a predetermined shape. The preform manufacturing portion 10 and the blow molding portion 20 are disposed adjacent to each other, and are configured as one unit.

The preform manufacturing portion 10 is provided with an injection molding die 11 and a feeder 12 as a molding die.

The injection molding die 11 has a cavity formed in a predetermined shape corresponding to the preform P of a bottomed tubular shape. In the present embodiment, the injection molding die 11 is provided with a plurality of cavities. More specifically, the injection molding die 11 is a batch type provided with a total of 30 cavities; 5 columns in the vertical direction and 6 rows in the horizontal direction. Although not illustrated in detail in the drawings, the injection molding die 11 can be opened, and each of the cavities are opened all at once by opening the injection molding die 11. Note that in FIG. 1, for convenience, only one preform P is labeled by a reference numeral.

The feeder 12 heats the thermoplastic resin to a temperature suitable for injection molding, and the molten thermoplastic resin by this heating is supplied at a predetermined pressure into each of the cavities in the injection molding die 11 in a closed state. The feeder 12 can use a configuration having, for example, a heating cylinder for heating and melting the thermoplastic resin, and a screw provided in the heating cylinder that pours while kneading the heated thermoplastic resin into the cavity. In other words, the feeder 12 can inject the thermoplastic resin into each of the cavities of the injection molding die 11.

Various types of resin suitable for molding the container C such as polypropylene (PP), polyethylene (PE), polyethylene terephthalate (PET), and the like can be used as the thermoplastic resin supplied to the cavities by the feeder 12, that is, the resin material for molding the container C. Furthermore, a configuration that laminates a plurality of types of thermoplastic resins can be used.

The heating temperature of the thermoplastic resin in the feeder 12 is preferably set to 210° C. to 240° C. when using polypropylene and polyethylene as the thermoplastic resin, and 280° C. to 285° C. when using polyethylene terephthalate as the thermoplastic resin.

When the molten thermoplastic resin is injected at a predetermined pressure into each of the cavities of the injection molding die 11 from the feeder 12, the thermoplastic resin is molded into the preform P of a bottomed tubular shape in each of the cavities. Thus, the resin preform P having a bottomed tubular shape is manufactured by injection molding in the preform manufacturing portion 10.

An automatic removal device 13 is provided in the injection molding die 11; /the preforms P injection molded from the opened injection molding die 11 are removed all at once by the automatic removal device 13. The preforms P removed by the automatic removal device 13 are disposed in a conditioning station 14 provided between the preform manufacturing portion 10 and the blow molding portion 20.

The plurality of preforms P removed from the cavity of the injection molding die 11 are adjusted to or held at a predetermined temperature equal to or greater than a temperature suitable for liquid blow molding in the conditioning station 14. That is, even if the plurality of preforms P removed from the cavity in the injection molding die 11 each have a temperature difference, the temperature of the preform P is made to be uniform at a predetermined temperature in the conditioning station 14. The conditioning station 14 can be configured using, for example, insulation material, heater, and the like.

Note that the temperature of the preform P in the conditioning station 14, for example, is preferably set to 130° C. to 145° C. when using polypropylene and polyethylene as the thermoplastic resin, and 120° C. to 135° C. when using polyethylene terephthalate as the thermoplastic resin.

A predetermined number of preforms P (six in the case illustrated in the drawings) among the preforms P held at a predetermined temperature in the conditioning station 14 are disposed in series to an alignment portion of the conditioning station 14 by an aligning device not illustrated. At this time, the alignment direction of the plurality of preforms P is a direction along a direction from the preform manufacturing portion 10 to the blow molding portion 20.

The blow molding portion 20 is provided with a blow molding die 21 and a pressurized liquid feeder 22.

The blow molding die 21 has a cavity 21a molded into a predetermined shape (bottle shape) corresponding to the container C. As illustrated in FIG. 1, in the present embodiment, the blow molding die 21 is provided with a plurality of cavities 21a. More specifically, the blow molding die 21 is a batch type provided with five cavities 21a in series. Although not illustrated in detail in the drawings, the blow molding die 21 can be opened to the left and right, and by opening the blow molding die 21, each of the cavities 21a can be opened all at once and the container C can be removed from the blow molding die 21 after blow molding. Furthermore, the preform P is inserted into each cavity 21a as a state where the blow molding die 21 is open, and then by clamping the blow molding die 21, the preform P can be disposed in each cavity 21a. The upper surface of the blow molding die 21 is opened upwards, and the open portion of the preform P is disposed in the opening. Note that in FIG. 1, for convenience, only one cavity 21a is labeled by a reference numeral.

The pressurized liquid feeder 22 can provide a liquid pressurized at a pressure suitable for liquid blow molding in a plurality of preforms P disposed in each of the cavities 21a in the blow molding die 21. The pressurized liquid die 22, for example, can be configured provided with a plunger pump driven by a servomotor.

A nozzle unit 23 is provided in the upper portion of the blow molding die 21, and the pressurized liquid feeder 22 is connected to the nozzle unit 23. The nozzle unit 23 automatically moves up and down, and can come in contact with the upper surface of the blow molding die 21. Furthermore, the nozzle unit 23 is provided with a plurality (five in the present embodiment) of nozzles (not illustrated) that fit into the opening of the preforms P mounted on each of the cavities 21a of the die 21 when in contact with the upper surface of the blow molding die 21, and can provide a pressurized liquid provided from the pressurized liquid feeder 22 via the nozzle into the preforms P.

Note that the nozzle unit 23 is provided with a stretching rod for stretching the preform P in an axial direction during liquid blow molding. Furthermore, the pressurized liquid feeder 22 is provided with a liquid temperature adjusting device for maintaining a constant temperature for the liquid while circulating the liquid in the nozzle unit 23.

A content liquid filled in the bottle as the final product of a beverage, cosmetics, medicine, and the like can be used as the liquid for liquid blow molding in which the pressurized liquid feeder 22 supplies to the inside of the preforms P. Thus, it is possible to simplify the production process of the container C and the configuration of the container manufacturing device 1 by omitting the process for filling the content liquid into the container C after molding.

The container manufacturing device 1 is provided with a conveyor 30 for the preforms P. After being manufactured by the preform manufacturing portion 10, the plurality of preforms P disposed in series and held at a predetermined temperature in the conditioning station 14 are conveyed from the conditioning station 14 to the cavities 21a in the blow molding die 21 provided in the blow molding portion 20 via the conveyor 30. Here, as seen in FIG. 1, the alignment direction of the plurality of preforms P disposed in series in the conditioning station 14 is aligned with the alignment direction of the plurality of cavities 21a arranged in series in the blow molding die 21. Therefore, the plurality of preforms P arranged in series in the conditioning station 14 are conveyed in a linear path to the cavities 21a in the blow molding die 21 via the conveyor 30. Thus, the container manufacturing device 1 is a linear type, wherein the preforms P manufactured by the preform manufacturing portion 10 is linearly conveyed towards the blow molding portion 20.

A conveyor 8 can be configured provided with, for example, a plurality (five in the case illustrated in the drawings) of grip portions 30a that can grip the opening of the preform P. In this case, the conveyor 30 conveys the plurality of preforms P disposed in series in the conditioning station 14 to the corresponding cavities 21a by being held by the respective grip portions 30a.

Thus, the container manufacturing device 1 of the present invention is provided with a preform manufacturing portion 10 for manufacturing the preforms P by injection molding, and adjacent thereto, a blow molding portion 20 for liquid blow molding the preforms P in a container C of a predetermined shape, and because the preforms P are conveyed to the cavities 21a in the blow mold die 21 using the conveyor 30, the conveying cost of the preforms P required when manufacturing the preforms P by a blow molding device in another location is unnecessary, and the manufacturing cost of the resin container C can be decreased.

Furthermore, because the present invention is provided with a preform manufacturing portion 10 for manufacturing the preforms P by injection molding a molten thermoplastic resin, and adjacent thereto, a blow molding portion 20 for liquid blow molding the preforms P in a container C of a predetermined shape, the preforms P manufactured in the preform manufacturing portion 10 are conveyed to the cavities 21a in the blow molding die 21 while maintaining a residual heat state equal to or greater than the temperature suitable for liquid blow molding in the blow molding portion 20 via the conveyor 30, and the preforms P can be liquid blow molded by the blow molding portion 20 while maintaining the residual heat state. In other words, the preforms P molded by injection molding the molten thermoplastic resin in the preform manufacturing portion 10 becomes a state of residual heat in which the heat from heating during injection molding remains immediately after being manufactured, and the temperature is equal to or greater than the temperature suitable for liquid blow molding, that is, equal to or greater than a temperature at which a stretching effect is exhibited. Thus, in the present invention, conveying the preforms P manufactured by injection molding to the cavities 21a in the blow molding die 21 by the conveyor 30 while the residual heat remains allows liquid blow molding to be performed using the residual heat. Thus, the preforms P after injection molding, rather than being reheated using a heating furnace and the like, are set to a temperature suitable for liquid blow molding using minimal equipment or energy even if heating is required, and liquid blow molding is possible in the blow molding portion 20.

In particular, when the conditioning station 14 is provided between the preform manufacturing portion 10 and the blow molding portion 20, the preforms P are set to an optimal temperature for liquid blow molding, and can accurately mold the preforms P in the container C.

Note that in the present embodiment, the plurality of preforms P removed from the cavity of the injection molding die 11 are disposed in series in the conditioning station 14, and because these preforms P are conveyed to the cavities 21a in the blow molding die 21 in a linear path via the conveyor 30, the preforms P can be quickly conveyed to the cavities 21a in the blow molding die 21 after injection molding while maintaining a state of residual heat.

Thus, in the present invention, because the preforms P manufactured by injection molding are conveyed to the cavities 21a in the blow molding die 21 by the conveyor 30 while maintaining a state of residual heat equal to or greater than a temperature suitable for blow molding and then liquid blow molded in the blow molding portion 20, reheating the preforms P after manufacture is unnecessary. Therefore, energy to reheat the preforms P is unnecessary, and manufacture cost of the container C can be reduced.

Furthermore, by the injection molding die 11 for manufacturing the preforms P and the blow molding die 21 for liquid blow molding the preforms P each respectively being a batch type having a plurality of cavities, the manufacture cost of the container C can be further decreased by efficiently carrying out injection molding and liquid blow molding of the preforms P.

Note that according to the present embodiment, although the preforms P are preferable conveyed to the cavities 21a in the blow molding die 21 while maintaining a residual heat state equal to or greater than a temperature suitable for liquid blow molding in the blow molding portion 20 via the conveyor 30, if there is residual heat during manufacture of the preforms P, the temperature is not particularly limited, for example, when the residual heat of the preforms P after manufacture is equal to or less than a temperature suitable for liquid blow molding, the preforms P can be heated to a temperature suitable for liquid blow molding in the conditioning station 14.

When liquid blow molding is completed, a cap is mounted on the opening of the container C, the completed container C is gripped by the grip portion 31a of a conveyor 31 different than the conveyor 30 described above, and is conveyed from the cavities 21a in the blow molding die 21 to a platform for product removal (not illustrated in drawings). Because the conveyor 31 on the removal side of the completed container C is provided separately from the conveyor 30 for conveying the preforms P to the cavities 21a in the blow molding die 21 after manufacture, removing the completed container C and supplying the preforms P to the cavities 21a in the blow molding die 21 can be carried out simultaneously, and the manufacture cycle for the container manufacturing device 1 can be shortened.

Figure 2:
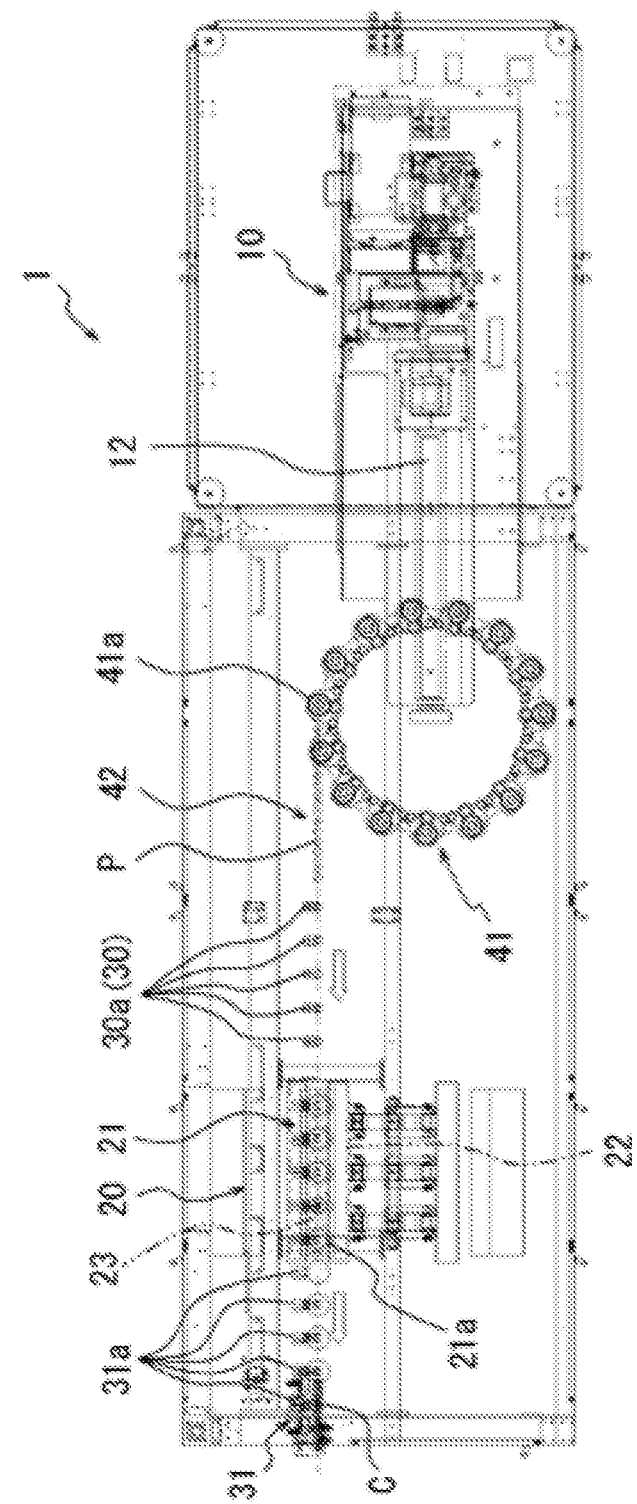
FIG. 2 is a planar view schematically illustrating another container manufacturing device embodying the principles of the present invention.

FIG. 2 is a planar view schematically illustrating the container manufacturing device, which is another embodiment of the present invention. Note that the members corresponding to the members described above will be denoted by the same reference numeral in FIG. 2.

In the embodiment illustrated in FIG. 1, the preform manufacturing portion 10 is configured to manufacture the preforms P by injection molding a heated thermoplastic resin using the injection molding die 11, but it is not limited to this, as illustrated in FIG. 2, the preform manufacturing portion 10 can be configured provided with a compression station for manufacturing the preforms P by compression molding the heated thermoplastic resin using a compression molding die 41.

The compression molding die 41 has a cavity 41a molded in a predetermined shape corresponding to the preform P of a bottomed tubular shape. As illustrated in FIG. 2, in the present embodiment, the compression molding die 41 is provided with a plurality of cavities 41a. More specifically, the compression molding die 41 is provided with 15 cavities 41a disposed in an annular shape, and is configured in a rotary type for rotating so that the cavities 41a are positioned in an opening (not illustrated in drawings) sequentially extruded from the feeder 12.

Note that the compression molding die 41 is not limited to the rotary type described above, but can also be configured to be a batch type.

The feeder 12 can be configured in an extruding device for providing a predetermined amount of thermoplastic resin in the cavities 41a by extruding the molten thermoplastic resin heated to a temperature suitable for compression molding to the inside of the cavities 41a in the compression molding die 41 in a closed state. When the molten thermoplastic resin is provided inside the cavities 41a in the compression molding die 41 from the feeder 12, the upper die is combined with the cavities 41a, and molds a preform P of a bottomed tubular shape while the thermoplastic resin is compressed inside the cavities 41a by the upper die. Thus, the resin preform P of a bottom tubular shape is formed by compression molding in the preform manufacturing portion 10.

After compression molding the preform P, the preform P can be removed from the cavities 41a by opening the compression molding die 41. The compression molding die 41 sequentially compression molds the preforms P in each of the cavities 41a while rotating, and sequentially supplies the preforms P to an accumulation line 42 provided adjacent to the compression molding die 41. Note that in FIG. 2, for convenience, only one cavity 41a and preform P is labeled by a reference numeral.

Note that the compression station as illustrated in FIG. 1 is provided in the accumulation line 42, and the plurality of preforms P stored in the accumulation line 42 are configured to be adjusted or held at a predetermined temperature suitable for liquid blow molding.

The plurality of preforms P stored in the accumulation line 42 are conveyed to the cavities 21a in the blow molding die 21 via the conveyor 30. At this time, similar to the case of injection molding, the preforms P are conveyed to the cavities 21a in the blow molding die 21 while maintaining a residual heat state equal to or greater than a temperature suitable for liquid blow molding in the blow molding portion 20 via the conveyor 30, and the container C of a predetermined shape is manufactured by liquid blow molding in the blow molding portion 20 while maintaining a residual heat state. In other words, even manufacturing the preforms P by compression molding in the preform manufacturing portion 10, by liquid blow molding the preforms P using residual heat during compression molding, the preforms P after compression molding can be liquid blow molded in the blow molding portion 20 without being reheated using a heating furnace and the like. Therefore, in the present embodiment, energy to reheat the preforms P is unnecessary, and the manufacturing cost of the container C can be reduced.

Note that in the present embodiment, similar to the case of injection molding, the preforms P are preferably conveyed to the cavities 21a in the blow molding die 21 while maintaining a residual heat state equal to or greater than a temperature suitable for liquid blow molding in the blow molding portion 20 via the conveyor 30, but if there is residual heat during manufacture of the preforms P, the temperature is not particularly limited, for example, when the residual heat of the preforms P after manufacture is equal to or less than a temperature suitable for liquid blow molding, the preforms P can be heated to a temperature suitable for liquid blow molding in the conditioning station provided in the accumulation line 42 and the like.

The present invention is not limited to the embodiment described above, and it goes without saying that various modifications can be made without departing from the intent thereof.

For example, in the embodiments described above, the injection molding die 11 is a batch type provided with a total of 30 cavities; 5 columns in the vertical direction and 6 rows in the horizontal direction, but the number and location of the cavities can be arbitrarily set.

Furthermore, in the present embodiment, the pressurized liquid feeder 22 is a plunger pump driven by a servomotor, but it is not limited to this, and for example, can be a configuration driven by another driving mechanism such as a hydraulic pressure, air, and the like.

In addition, in the embodiments described above, the conditioning station 14 is provided between the preform manufacturing portion 10 and the blow molding portion 20, but it is not limited to this; the conditioning station 14 could not be provided, and the preforms P manufactured by the preform manufacturing portion 10 may be liquid blow molded by being conveyed to the blow molding portion 20 via the conveyor 30 as it is in a residual heat state.

The invention claimed is:

1. A container manufacturing device for manufacturing a resin container, comprising:
   a preform manufacturing portion provided with a molding die having a plurality of cavities and a feeder configured to supply a molten thermoplastic resin into the plurality of cavities of the molding die for manufacturing of a resin preform;
   a conveyor for conveying preforms manufactured in the preform manufacturing portion; and
   a blow molding portion provided with a blow molding die having a plurality of cavities and a pressurized liquid feeder configured to supply pressurized liquid into the preforms being conveyed by the conveyor and disposed in the blow molding die for liquid blow molding of the preforms into a containers of a predetermined shape; wherein
   the manufacturing device being configured to maintain a residual heat state in the preforms and to convey the preforms in the residual heat state into the cavities of the blow molding die and then to liquid blow mold the preforms into the containers in the blow molding portion.

2. The container manufacturing device according to claim 1, wherein the conveyor configured to convey the preforms into the plurality of cavities in the blow molding die while in a residual heat state that is equal to or greater than a temperature suitable for liquid blow molding in the blow molding portion.

3. The container manufacturing device according to claim 1, wherein the molding die is an injection molding die, and the preform molding portion is an injection molding device.

4. The container manufacturing device according to claim 1, wherein the molding die is a compression molding die, and the preform molding portion is a compression molding device.

5. The container manufacturing device according to claim 1, further comprising a conditioning station, the condition station being configured to hold the preforms removed from the plurality of cavities of the molding die at a predetermined temperature provided between the preform manufacturing portion and the blow molding portion.

6. The container manufacturing device according to claim 5, wherein the conveyor is configured to convey the preforms in a linear path from the conditioning station to the plurality of cavities of the blow molding die.

7. The container manufacturing device according to claim 1, wherein the manufacturing device is configured to maintain the residual heat state of the preforms in the range of 120° C. to 145° C.

* * * * *